United States Patent
Haraguchi

[11] Patent Number: 6,152,615
[45] Date of Patent: Nov. 28, 2000

[54] CAMERA OR APPARATUS ADAPTED TO USE FILM CARTRIDGE OR DEVICE APPLICABLE TO SUCH CAMERA OR APPARATUS

[75] Inventor: Shosuke Haraguchi, Kanagawa-ken, Japan

[73] Assignee: Canon Kabushiki Kaisha, Tokyo, Japan

[21] Appl. No.: 08/854,772

[22] Filed: May 12, 1997

Related U.S. Application Data

[63] Continuation of application No. 08/358,837, Dec. 19, 1994, abandoned.

[30] Foreign Application Priority Data

Dec. 28, 1993 [JP] Japan .................................. 5-337493

[51] Int. Cl.⁷ ............................. G03B 17/26; G03B 17/02
[52] U.S. Cl. ......................... 396/511; 396/536; 396/538
[58] Field of Search ................................. 396/511, 512, 396/535, 536, 538

[56] References Cited

U.S. PATENT DOCUMENTS

| | | | |
|---|---|---|---|
| 3,820,136 | 6/1974 | Kennedy | 354/81 |
| 3,832,559 | 8/1974 | Thomas et al. | 250/468 |
| 5,049,914 | 9/1991 | Dassero | 354/288 |
| 5,122,823 | 6/1992 | Baxter et al. | 354/288 |
| 5,155,514 | 10/1992 | Tamamura | 354/174 |
| 5,159,365 | 10/1992 | Takahashi et al. | 396/319 |
| 5,179,402 | 1/1993 | Komatsuzaki | 354/288 |
| 5,231,438 | 7/1993 | Swart | 354/288 |
| 5,319,406 | 6/1994 | Takatori | 354/275 |
| 5,323,201 | 6/1994 | Richiuso et al. | 354/288 |
| 5,363,166 | 11/1994 | Takahashi et al. | 354/275 |
| 5,382,992 | 1/1995 | Kawamura et al. | 354/288 |
| 5,422,695 | 6/1995 | Katagiri | 354/173.1 |
| 5,430,515 | 7/1995 | Lawthor et al. | 354/174 |
| 5,440,364 | 8/1995 | Takahashi | 354/288 |

FOREIGN PATENT DOCUMENTS 480735  4/1992  Japan .

*Primary Examiner*—Eddie C. Lee
*Attorney, Agent, or Firm*—Robin, Blecker & Daley

[57] ABSTRACT

A camera or an apparatus adapted to use a film cartridge, or a unit applicable to the camera or the apparatus, includes a first device for engaging the film cartridge, and a second device for at least one of loading and unloading the film cartridge with respect to the camera by automatically moving the first device together with the film cartridge.

16 Claims, 14 Drawing Sheets

VIEWING DIRECTION A

CAMERA OR APPARATUS ADAPTED TO USE FILM CARTRIDGE OR DEVICE APPLICABLE TO SUCH CAMERA OR APPARATUS

This is a continuation application under 37 CFR 1.62 of prior application Ser. No. 08/358,837, filed Dec. 19, 1994, now abandoned.

BACKGROUND OF THE INVENTION

1. Field of the Invention

This invention relates to an apparatus such as a camera or the like adapted to use of a film cartridge and more particularly to a device for loading or unloading the film cartridge on or from the apparatus.

2. Description of the Related Art

A camera employing a method of placing a film cartridge in a cartridge chamber by axially inserting it into the cartridge chamber has been proposed in Japanese Laid-Open Patent Application No. HEI 4-231336, etc. by the applicant of the present application. The camera is provided with a push-out spring arranged to effect unloading of the film cartridge easier and a holding member arranged to prevent the film cartridge from popping out against the force of the push-out spring in loading the cartridge.

However, the camera cited above as a prior art example has required the camera operator to push the film cartridge deeply into the cartridge chamber. This requirement has necessitated an operation which is not only troublesome but tends to be not reliably carried out.

SUMMARY OF THE INVENTION

It is one aspect of this invention invention to provide a camera or an apparatus adapted to use a film cartridge, or a device to be applied to the camera or the apparatus, which includes first means for engaging the film cartridge, and second means for at least one of loading and unloading the film cartridge with respect to the camera by automatically moving said first means together with the film cartridge.

The arrangement according to this invention enables the film cartridge to be loaded or to be unloaded. (taken out) in a reliable manner and efficiently.

The above and other aspects and features of this invention will become apparent from the following detailed description of embodiments thereof taken in connection with the accompanying drawings.

DETAILED DESCRIPTION OF THE PREFERRED EMBODIMENTS

Figure 1:
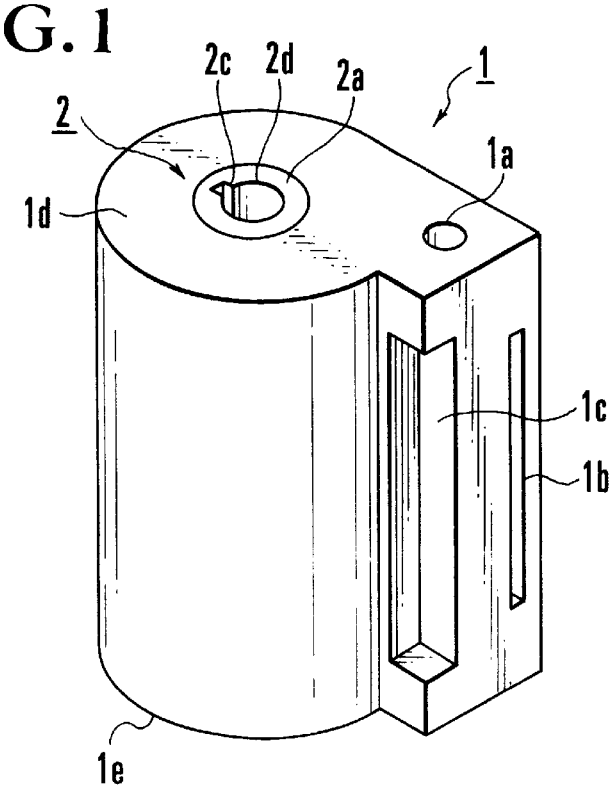
FIG. 1 is an oblique view showing a film cartridge which relates to embodiments of this invention.

Some of embodiments of this invention are described below with reference to the drawings, wherein:

FIGS. 1 to 11 show a first embodiment of this invention. FIG. 1 is an oblique view showing a film cartridge 1 to be used by the first embodiment. Referring to FIG. 1, the film cartridge 1 is provided with a positioning hole 1a, a film inlet/outlet port 1b and a recessed part 1c. A film which is not shown is wound around a spool shaft 2 which is supported to be rotatable relative to the film cartridge 1. The spool shaft 2 is provided with an impinging face 2a, a positioning hole 2b and a key way 2c. The spool shaft 2 is arranged to be rotatable by means of a driving member which will be described later. These parts are arranged on the datum plane side 1d of the film cartridge 1. The spool shaft 2 is exposed also on the opposite side 1e of the film cartridge 1. The film cartridge 1 is arranged such that the film which is not shown can be moved out through the film inlet/outlet port 1b by causing the spool shaft 2 to rotate clockwise. The film can be rewound and taken in by rotating the spool shaft counterclockwise. The film cartridge 1 can be ideally set by determining a center in the horizontal direction and its position in the axial direction using the spool shaft 2 and a driving member which will be described later. The positioning hole 1a is used for preventing the film cartridge from rotating in the horizontal direction.

Figure 2:
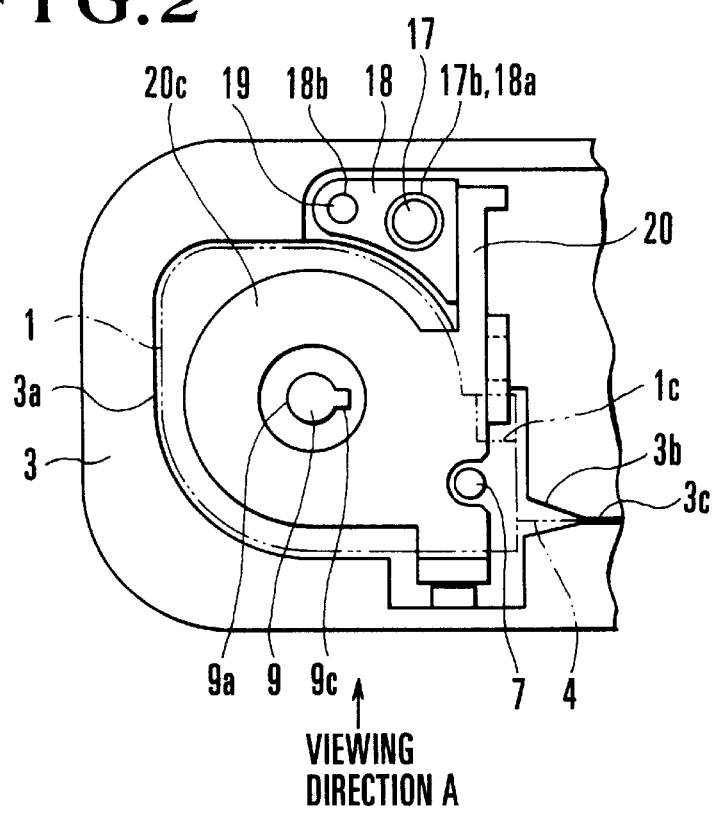
FIG. 2 is a layout view of a cartridge chamber arranged in a first embodiment of this invention.
Figure 3:
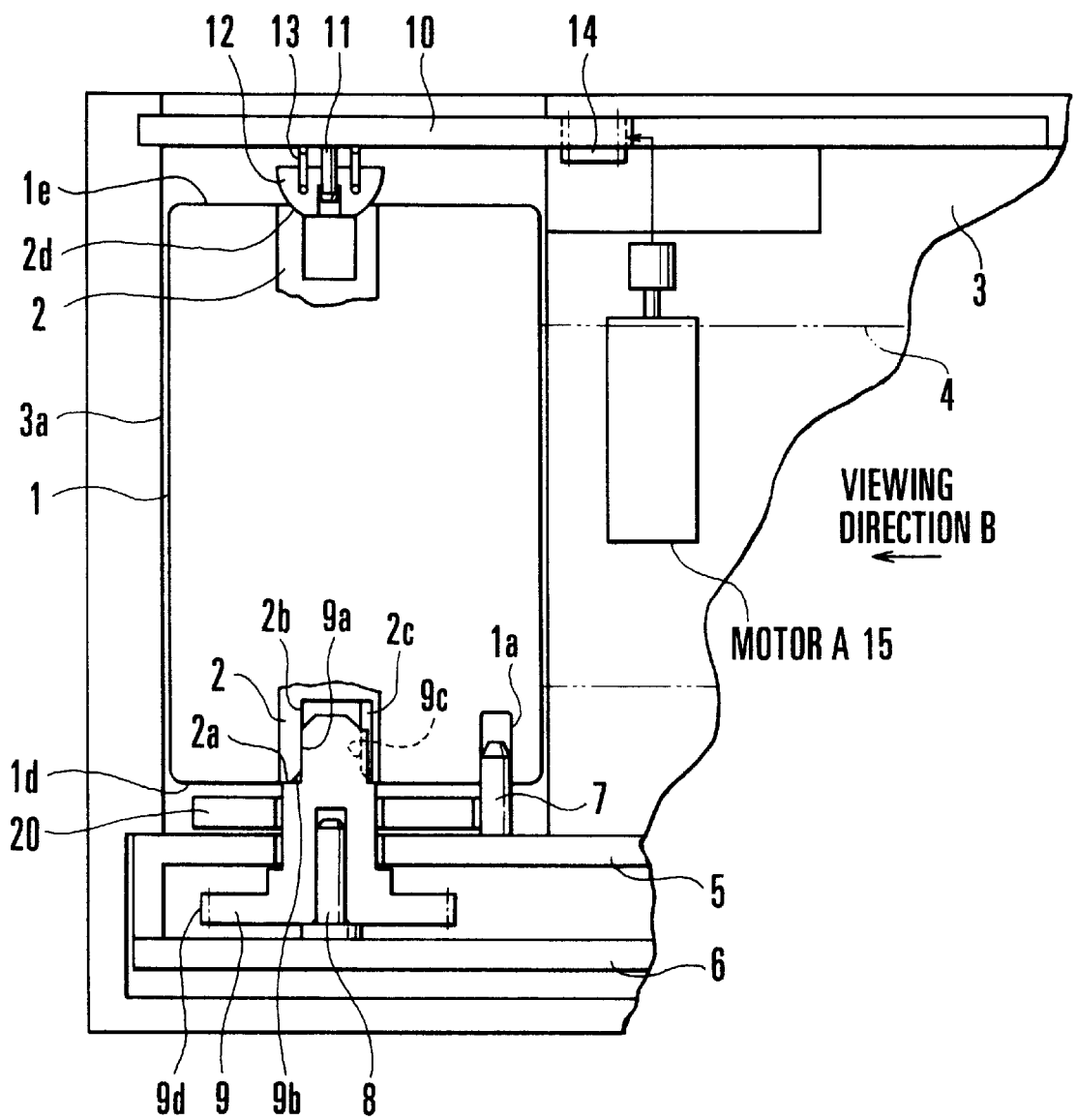
FIG. 3 shows the first embodiment as in a state of having been completely loaded with a film cartridge.
Figure 4:
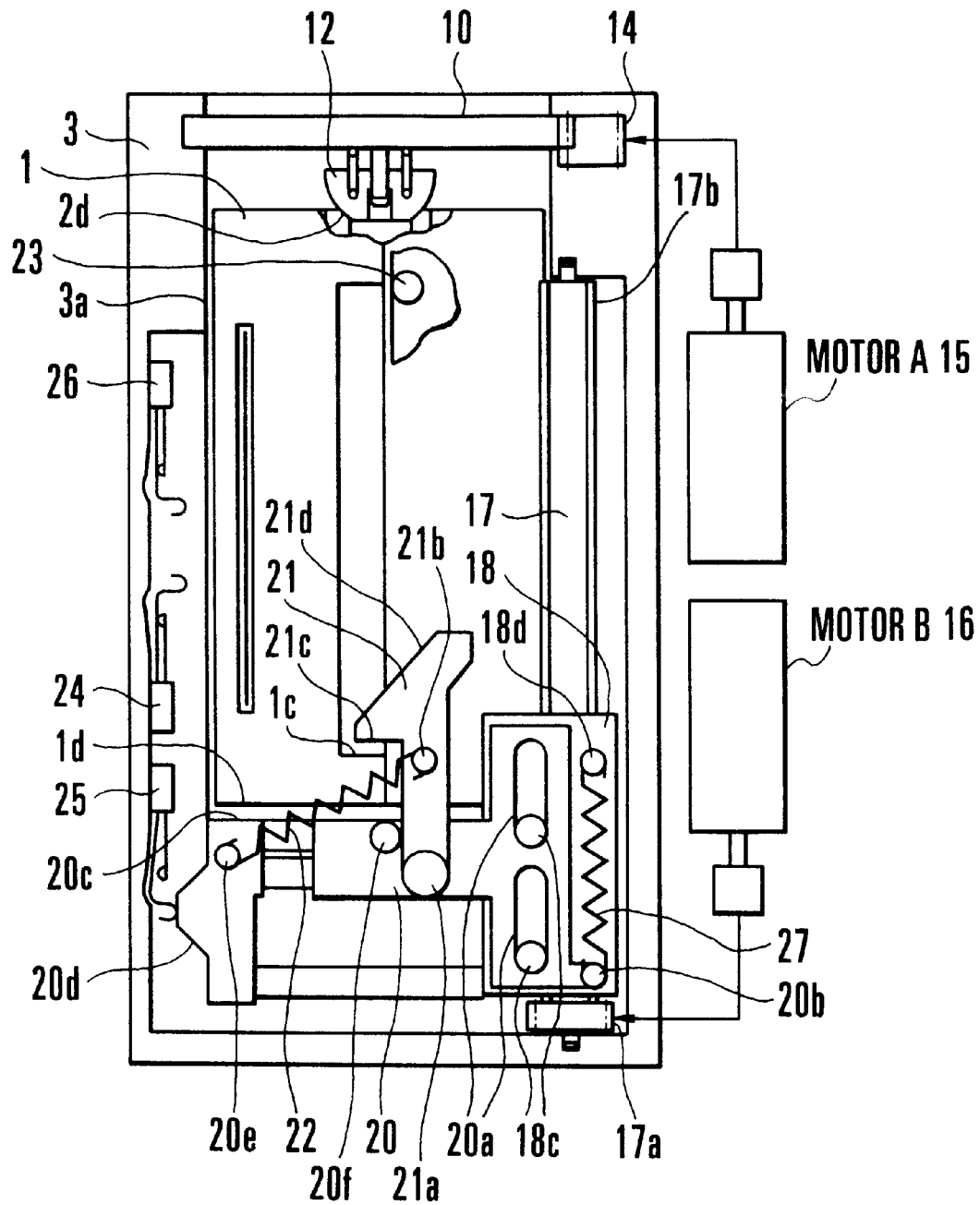
FIG. 4 shows the first embodiment also as in a state of having been completely loaded with a film cartridge.

The cartridge chamber of the camera of this embodiment is next described with reference to FIGS. 2 to 4. FIG. 2 shows the layout of the cartridge chamber in which the film cartridge is to be loaded. FIG. 3 is a view taken in the direction of arrow A of FIG. 2 and shows a state obtained after completion of film cartridge loading. FIG. 4 is a view taken in the direction of arrow B of FIG. 3 and shows also the state obtained after completion of film cartridge loading.

The layout of the cartridge chamber is first described as follows. The cartridge chamber 3a is formed in a camera body 3. Referring to FIG. 2, the film cartridge 1 is loaded with its datum plane side 1d set to be below the paper of the drawing as viewed on FIG. 2. A film 4 is led to a tunnel 3c through a guide part 3b. A method for carrying the film is well known and, therefore, is omitted from description. A photo taking optical system, exposure control means, means for film rewinding, etc. of the camera are assumed to be of the kinds well known and, therefore, are also omitted from description.

A positioning action to be performed on the film cartridge 1 is next described. Referring to FIG. 3, holding plates 5 and 6 are secured to a camera body 3. A positioning pin 7 is secured to the holding plate 5. A driving member 9 is rotatably carried by a shaft 8 which is formed in one body with the holding plate 6. The driving member 9 is provided with a positioning shaft part 9a, an impinging datum face 9b and a key part 9c. These parts are arranged to act respectively on the positioning hole 2b, the impinging face 2a and the key way 2c of the film cartridge 1 in such a way as to permit positioning the film cartridge 1 and transmission of a rotation force to the film cartridge 1. Further, the cartridge chamber 3a is arranged to be not in contact with the film cartridge 1. A driving force from a motor C which will be described later is arranged to be transmitted to a gear part 9d of the driving member 9 to drive the driving member 9 to rotate either in the normal or reverse direction for transporting or rewinding the film 4.

A sliding lid 10 has a shaft 11 secured thereto. A retaining member 12 is rotatably fitted on the shaft 11 and is urged by a spring 13 in the direction of pushing the spool shaft 2 of the film cartridge 1. In FIG. 3, the sliding lid 10 is shown as in a closed state. Under this condition, the retaining member 12 abuts on a tapered part 2d of the spool shaft 2 in such a way as to center the opposite side 1e of the film cartridge 1 and also to ensure the impingement of the impinging face 2a on the impinging datum face 9b. An end face of the sliding lid 10 is formed into a rack, which is in mesh with a pinion 14. A motor A is arranged to cause the pinion 14 to rotate either forward or backward to open or close the sliding lid 10 through a reduction gear train which is not shown. Completion of this lid opening or closing action, is arranged to be detected by a lid-open-state detecting switch or by a lid-closed-state detecting switch, as will be described later herein.

A mechanism which is arranged to pull in or push out the film cartridge 1 is described as follows. Referring to FIG. 4, a motor B 16 is arranged to rotate in normal and reverse directions. The output of the motor 16 is arranged to be transmitted to a gear 17a of a feeding screw member 17 through a reduction gear train which is not shown. The feeding screw member 17 is rotatably carried by the camera body 3 and includes a feeding screw part 17b. A moving member 18 has a feeding screw part 18a (see FIG. 2) and intermeshes with the feeding screw part 17b to move upward or downward according as the feeding screw member 17 rotates. The following description is given on the assumption that the moving member 18 moves downward when the motor B 16 is energized in the direction of a normal rotation and upward when the motor B 16 is energized in the direction of a reverse rotation. Again referring to FIG. 2, a shaft 19 is mounted on the camera body 3 and is arranged to prevent the moving member 18 from rotating by acting on a rotation restricting hole 18b provided in the moving member 18. A lift member 20 is mounted on the moving member 18 as shown in FIG. 4. The lift member 20 is vertically slidable up and down within a range defined by sliding slots 20a formed in the lift member 20 in conjunction with guide pins 18c secured to the moving member 18. An absorbing spring 27 is urging the lift member 20 to move upward relative to the moving member 18 by acting on the moving member 18 and projections 18d and 20b provided on the lift member 20. The lift member 20 has a push-up face 20c which acts on the datum plane side 1d of the film cartridge 1 in pushing up the film cartridge 1. The lift member 20 further has a position detecting projection 20d which is provided for detecting the position of the lift member 20, as will be further described later. An engaging member 21 has its shaft part 21a arranged to enable it swingable with respect to the lift member 20. A spring 22 acts on the projections 20e and 21b of the lift member 20 and the engaging member 21 to exert its spring force to bring the lift member 20 to a position where it is restricted by a stopper 20f and to urge the engaging member 21 to swing counterclockwise. The engaging member 21 has an engaging part 21c arranged to act on the recessed part 1c of the film cartridge 1 to ensure a descent of the film cartridge 1 without fail in lowering it. A guide pin 23 which is secured to the camera body 3 is arranged to act on the cam face 21d of the engaging member 21 when the moving member 18 moves upward to cause the moving member 21 to swing clockwise against the force of the spring 22 in such a way as to render the film cartridge 1 extractable by disengaging the engaging part 21c from the recessed part 1c of the film cartridge 1. The absorbing spring 27 is arranged to enable the lift member 20 to move together with the moving member 18 during this action.

A switch A 24, a switch B 25 and a switch C 26 are arranged to be turned off from their on-states by the action of a position detecting projection 20d of the lift member 20. The switch A 24 is provided for detecting the film cartridge loading action. The switch B 25 is for detecting the end of the film cartridge lowering action. The switch C 26 is for detecting the end of the film cartridge lifting action.

An important point of the arrangement described above resides in that the engaging member 21 acts on the recessed part 1c of the film cartridge 1 only in lowering the film cartridge 1. In other words, when the embodiment is in the state of having been loaded with the film cartridge as shown in FIG. 3, the engaging part 21c of the engaging member 21 is not acting on the recessed part 1c, as shown in FIG. 4, while the impinging face 2a of the spool shaft 2 is abutting on the impinging datum face 9b of the driving member 9. The film cartridge 1 is thus pushed by the retaining member 12. Under this condition, the push-up face 20c of the lift member 20 is located away from the datum plane side 1d of the film cartridge 1. It is conceivable to arrange the mechanism for pulling in and pushing up the film cartridge 1 in a different manner. For example, the film cartridge 1 may be arranged to be driven by means of a friction roller by bringing the friction roller into contact with the external surface of the film cartridge 1 to move the latter by a frictional force. The method of having recourse to the fictional force not only hardly ensures a reliable driving force but also fails to carry the film cartridge in an ideal manner as the external surface remains under the pushing pressure. In view of these points, the mechanism is preferably arranged according to the method employed by this embodiment.

Figure 5:
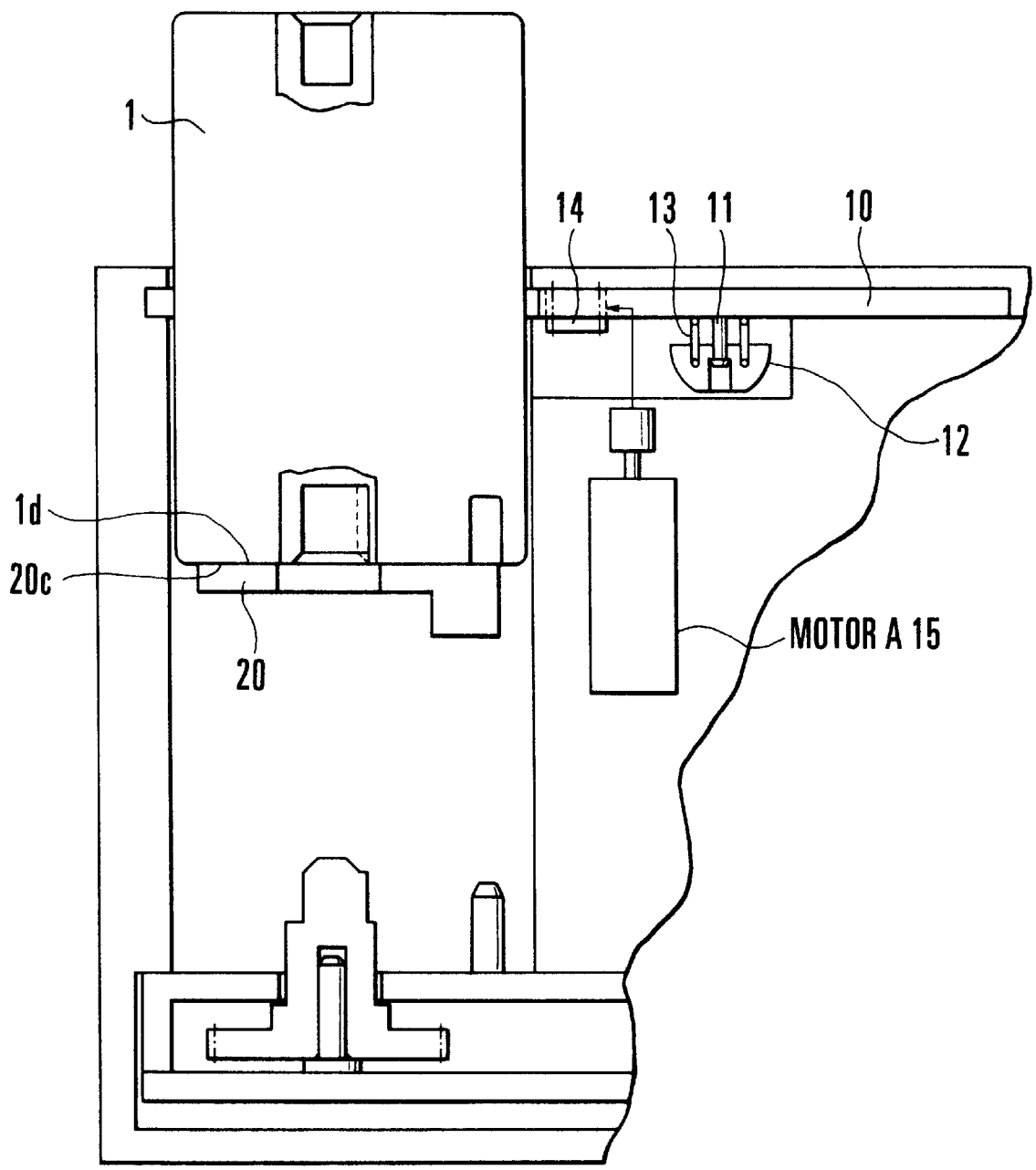
FIG. 5 shows the first embodiment as in a state of having completed a film cartridge lifting action.
Figure 6:
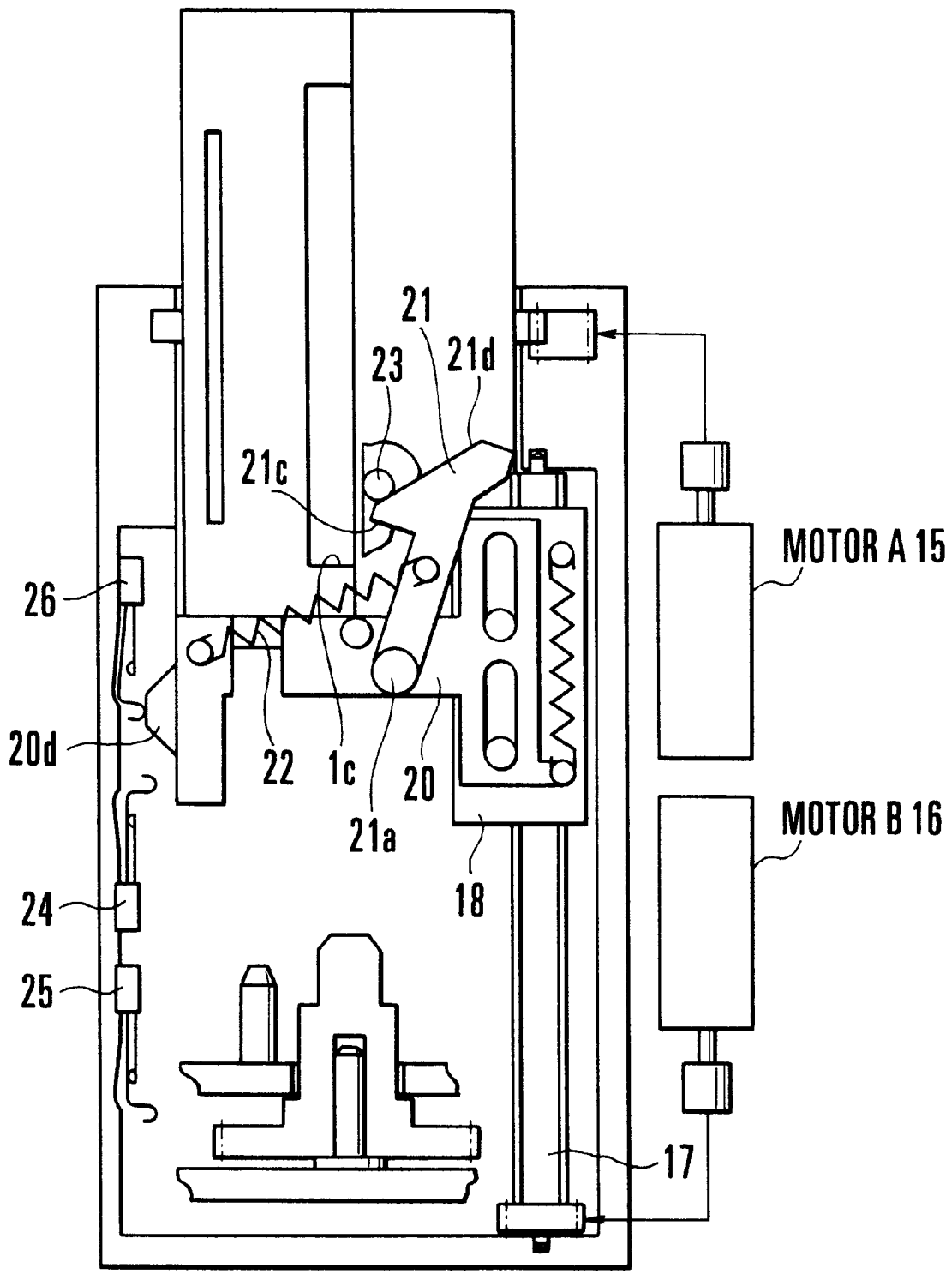
FIG. 6 shows the first embodiment also as in a state of having completed a film cartridge lifting action.

The various operating states of the above-stated mechanism are described as follows. FIGS. 5 and 6 show parts of structural arrangement corresponding to FIGS. 3 and 4, as in a state obtained after completion of the film cartridge lifting action. The sliding lid 10 has been changed from its position shown in FIGS. 3 and 4 to an open position through the pinion 14 by energizing the motor A 15 in the normal direction. The lid-open-state detecting switch which is not shown is in its on-state under this condition. After the action mentioned above, the motor B 16 is energized in the reverse direction to cause the moving member 18 to be moved upward by the action of the feeding screw member 17. The motor B 16 is deenergized to bring it to a stop when the switch C 26 is turned off by the position detecting projection 20d. In the state thus obtained, the engaging member 21 has been swung clockwise through the joint action of guide pin 23 and the cam face 21d to disengage its engaging part 21c from the recessed part 1c of the film cartridge 1. The film cartridge 1 thus can be easily taken out by hand.

Figure 7:
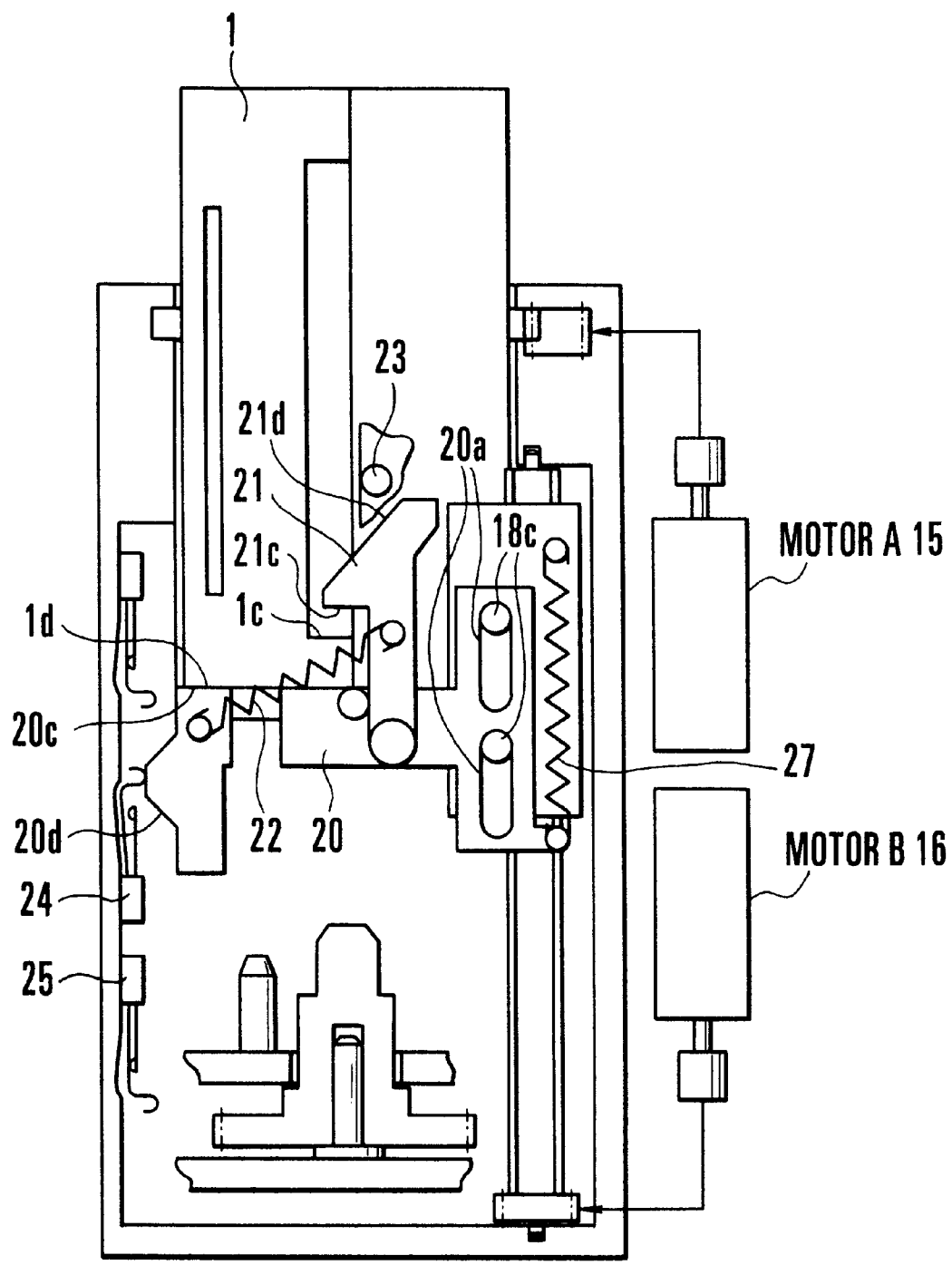
FIG. 7 shows the first embodiment as in a state of detecting a film cartridge loading action.

FIG. 7 shows parts of structural arrangement corresponding to the parts shown in FIG. 4 as in a state obtained when a film cartridge loading operation by the operator is detected. When the operator drops the film cartridge 1 into the cartridge chamber 3a, a state which is as shown in FIG. 6 is first brought about by the weight of the film cartridge. After this, when the film cartridge 1 is pushed with a finger further into the cartridge chamber, the state of FIG. 6 changes to a state as shown in FIG. 7. In this state, the datum plane side 1d of the film cartridge 1 pushes the push-up face 20c of the lift member 20 and then comes down against the force of the absorbing spring 27 within a range defined by the guide parts 18c and the guide slots 20a. Then the guide projection 23 is released from its contact with the cam face 21d to allow the engaging member 21 to be swung counterclockwise by the urging force of the spring 22. The engaging part 21c is thus brought into an area of engaging the recessed part 1c of the film cartridge 1. The position detecting projection 21d turns off the switch A 24. The turning off of the switch A 24 serves as a signal to cause the motor 16 to be energized in the normal direction. The motor 16 causes the moving member 18 to move downward passing through an area of absorption provided between the lift member 20 by the absorbing spring 21, even before the pushing finger is detached. The engaging part 21c of the engaging member 21 then engages the recessed part 1c of the film cartridge 1 and the film cartridge pulling-in action begins.

Figure 8:
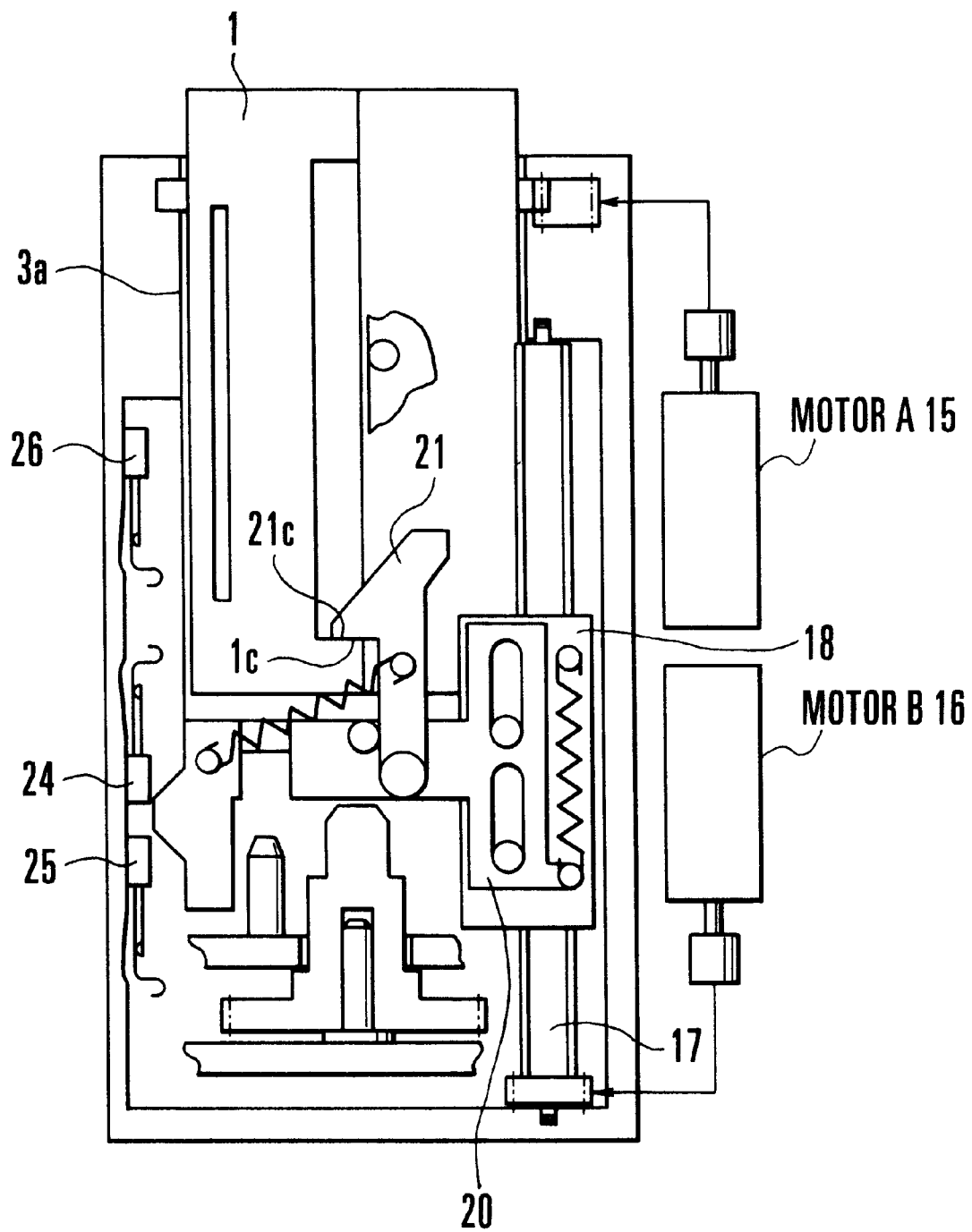
FIG. 8 shows the first embodiment as in a state of performing a film cartridge pulling-in action.

FIG. 8 shows the embodiment as being halfway in process of the film cartridge pulling-in action. The motor B 16 is in a state of being energized in the normal direction. The rotation of the feeding screw member 17 is causing the moving member 18, the lift member 20 and the engaging member 21 to make a descent together. The engaging part 21c and the recessed part 1c are acting to have the film cartridge 1 in process of being pulled in. Referring to FIG. 8, if the film cartridge 1 is allowed to fall by its own weight in an ideal manner without touching the wall of the cartridge chamber 3a, the film cartridge 1 can be set in its pulled-in position without having recourse to the engaging member 21. However, the film cartridge 1 cannot be set in the pulled-in position if the camera is in a slanting or upside-down posture. With the camera in such a posture, if the sliding lid 10 is closed by energizing the motor A 15 in the reverse direction, the film cartridge 1 would interfere with the lid 10 to cause a malfunction. Hence the engaging member 21 is necessary.

With the motor B 16 continuously energized in the normal direction, the film cartridge 1 is pulled further inward from the state of FIG. 8. The lift member 20 then comes down to the state of FIG. 4. The switch B 25 is turned off. The motor B 16 is deenergized. At this time, the film cartridge is allowed to be pushed in only to an extent defined by the engaging part 21c of the engaging member 21. The motor A 15 is then energized in the reverse direction. This causes the sliding lid 10 to be closed. The urging force of the spring 13 causes the retaining member 12 to push the tapered part 2d of the spool shaft 2. Under this condition, the lid-closed-state detecting switch which is not shown turns on. The motor 15 is deenergized. Then there obtains the film-cartridge-loading-completed state as shown in FIGS. 3 and 4. With the sliding lid 10 closed, the impinging face 2a of the spool shaft 2 of the film cartridge 1 is pushed against the impinging datum plane 9b by the urging force of the spring 13. At the same time, the centering action on the spool shaft is completed. Under this condition, the film cartridge 1 is in the lowered (pulled-in) position where the engaging part 21c of the engaging member 21 no longer acts on the recessed part 1c of the film cartridge 1.

Figure 9:
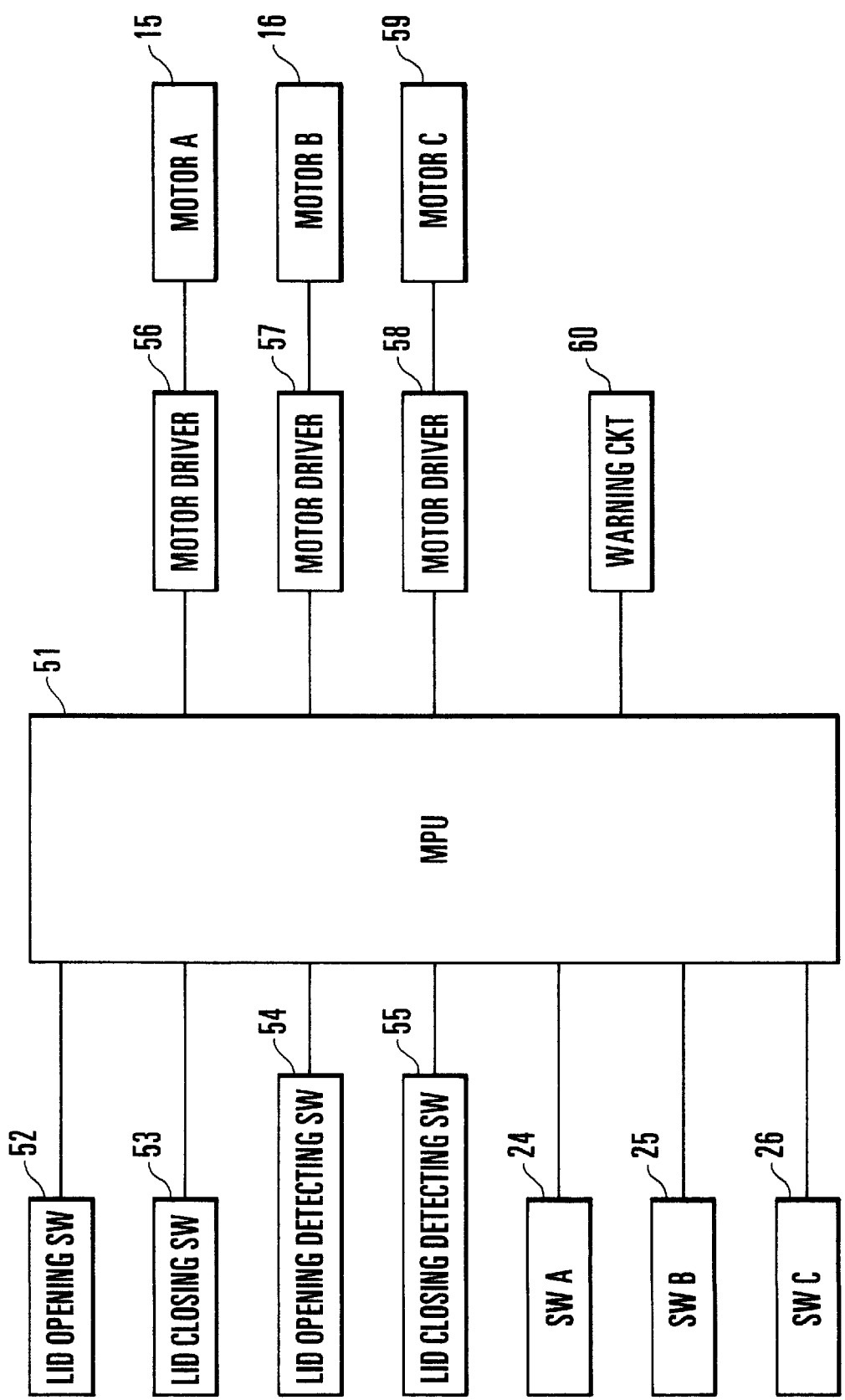
FIG. 9 is a block diagram showing a circuit arrangement of the first embodiment.

FIG. 9 is a block diagram showing a circuit arrangement made for carrying out the actions described above. In FIG. 9, a reference numeral 51 denotes a microcomputer (hereinafter referred to as MPU). Input signals are shown on the left side of the MPU 51 while output signals are shown on the right side of the MPU 51. A lid opening switch 52 and a lid closing switch 53 are arranged to turn on when they are manually operated by the operator. A lid opening detecting switch 54 and a lid closing detecting switch 55 are arranged to detect completion of the actions of the sliding lid 10. The switch A 24, the switch B 25 and the switch C 26 are arranged to detect movement of the lift member 20 as mentioned in the foregoing.

The motor A 15 for driving the sliding lid 10 is arranged to be driven via a motor driver 56. The sliding lid 10 acts to open when the motor A 15 is energized in the normal direction and to close when the motor A 15 is energized in the reverse direction. The motor B 16 for driving the moving member 18 is arranged to be driven via a motor driver 57. The moving member 18 moves down when the motor B 16 is energized in the normal direction and moves upward when the motor B 16 is energized in the reverse direction. The motor C 59 for driving the driving member 9 is arranged to be driven via a motor driver 58. The film is moved forward (or payed out) when the motor C 59 is energized in the normal direction and is moved backward (or rewound) when the motor C 59 is energized in the reverse direction. A warning circuit 60 is arranged to give warnings of varied kinds.

Figure 10:
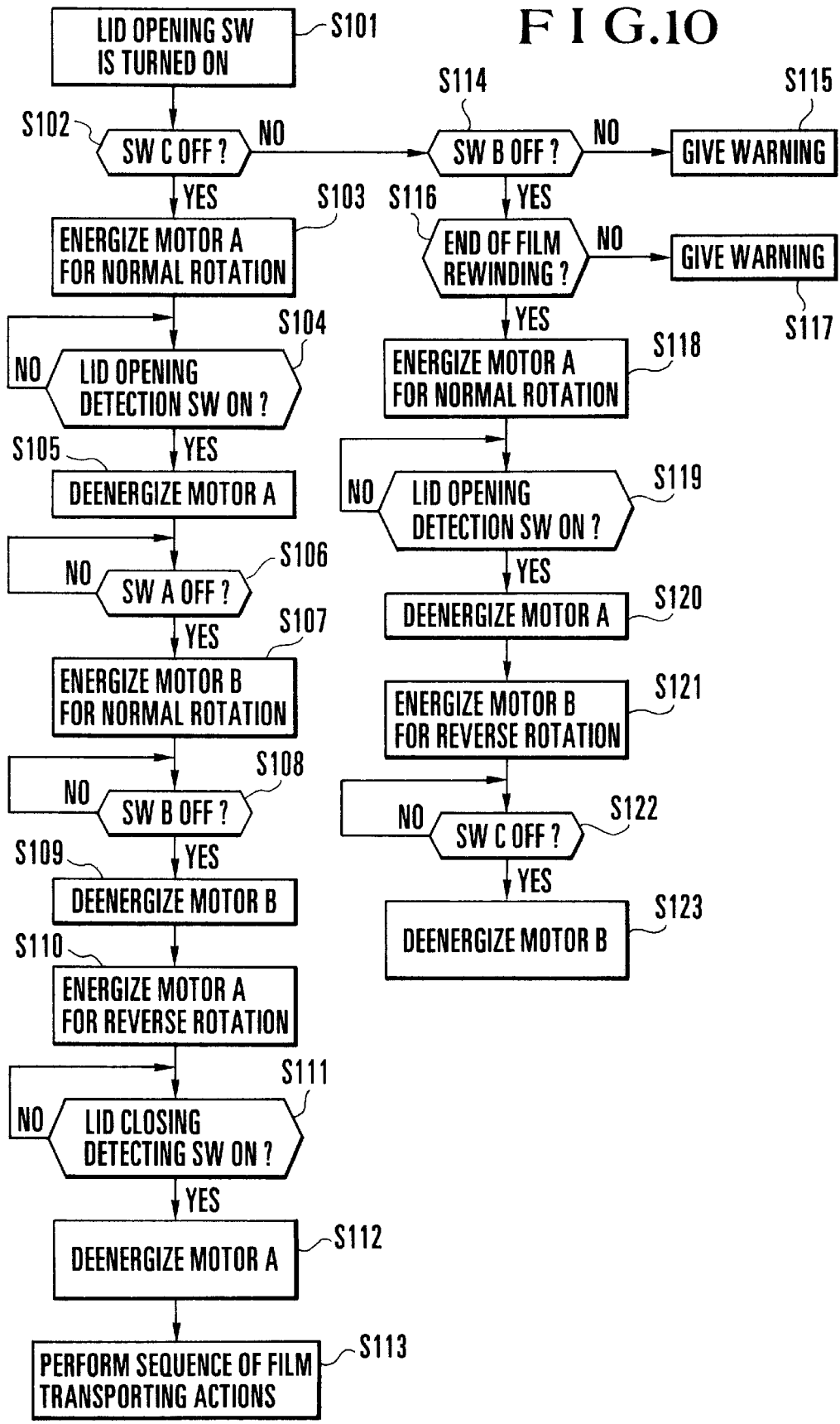
FIG. 10 is a flow chart showing the operation of the circuit arrangement shown in FIG. 9.

An operation of the circuit arrangement of FIG. 9 to be performed when the lid opening switch 51 is turned on is described below with reference to FIG. 10, which is a flow chart showing the flow of operation of the MPU 51.

At a step #101, the lid opening switch 52 is turned on. The flow of operation comes to a step #102. At the step #102, a check is made for the state of the switch C 26. If the switch C is found to be in an off-state, the lift member 20 is judged to be in the state of FIG. 6 and the flow comes to a step #103. At the step #103, the motor driver 56 is caused to energize the motor A 15 in the normal direction, i.e. in the direction of a normal rotation, in such a way as to open the sliding lid 10. At a step #104, a check is made to find if the lid opening switch 54 has turned on. If so, the flow comes to a step #105. At the step #105, the motor driver 56 is caused to stop energizing the motor A 15. At a step #106, the flow waits for turning off of the switch A 24. This is a sequence of processes beginning with insertion of the film cartridge by the operator in the state of FIG. 6 and ending with detection of pushing the film cartridge to the state of FIG. 7. When the switch A 24 is found to have turned off, the flow comes to a step #107. At the step #107, the motor driver 57 is caused to begin to energize the motor B 16 in the normal direction (for a normal rotation). At a step #108, a check is made to find if the switch B 25 has turned off. If so, the flow comes to a step #109 to cause the motor driver 57 to stop energizing, i.e. to deenergize, the motor B 16. Under this condition, the lift member 20 and the film cartridge 1 become as shown in FIG. 4 and the film cartridge pulling-in action is finished. The flow comes to a next step #110 to cause the motor driver 56 to energize the motor A 15 in the reverse direction, i.e. in the direction of a reverse rotation, for a sliding lid closing action. At a step #111, a check is made to find if the lid closing detecting switch 55 has tuned on. If so, the flow comes to a step #112 to cause the motor driver 56 to stop energizing the motor A 15. Then there obtains the state of FIG. 4. The sequence of processes for loading the film cartridge 1 is finished. The flow comes to a step #113 to begin to execute a sequence of film transporting processes. More specifically, the motor driver 58 is caused to energize the motor C 59 in the normal direction, i.e. for a normal rotation, to begin to pay out the film. The actions of the camera are c on trolled according to a predetermined sequence of processes. Further details of this sequence of processes are omitted in the following description.

If the switch C 2 6 is found not to have turned off at the step #102, thus indicating that the lift member 20 is not in the state of FIG. 6, the flow of operation comes to a step #114. At the step #114, a check is made to find if the switch B 25 has turned off. If not, it indicates that the lift member 20 is not in the state of FIG. 4 and indicates an abnormal state. The flow then comes to a step #115 to cause the warning circuit to give a warning for the abnormal state. If the switch B 25 is found at the step #114 to have turned off, the flow comes to a step #116. At the step #116, a check is made to find if film rewinding has been finished. If not, the flow comes to a step #117 to cause the warning circuit 60 to warn the operator that the camera is still in process of photographing. If so, the flow comes to a step #118. At the step #118, the motor driver 56 is caused to energize the motor A 15 in the normal direction for opening the sliding lid 10. At a step #119, a check is made to find if the lid opening detecting switch 54 has turned on. If so, the flow comes to a step #120 to cause the motor driver 56 to stop energizing the motor A 15. At a next step #121, the motor driver 57 is caused to energize the motor B 16 in the reverse direction, i.e. for a reverse rotation, for pushing out the film cartridge 1. At a step #122, a check is made to find if the switch C 26 has turned off. If so, the flow comes to a step #123 to cause the motor driver 57 to stop energizing the motor B 16. A state thus obtained is as shown in FIG. 6.

Figure 11:
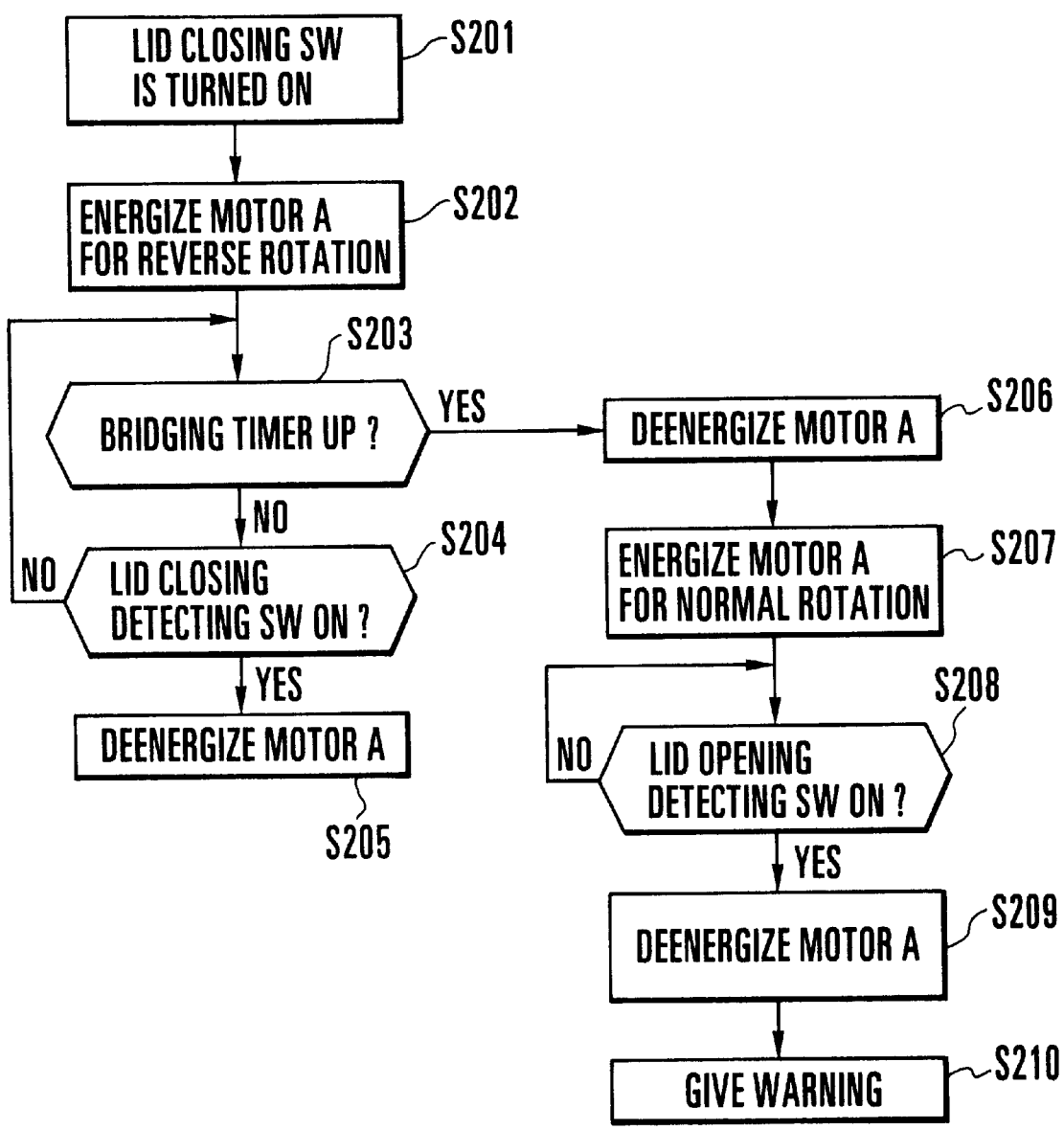
FIG. 11 is another flow chart showing the operation of the circuit arrangement shown in FIG. 9.

Next, an operation to be performed by the MPU 51 when the lid closing switch 53 of the circuit arrangement of FIG. 9 is turned on is described with reference to the flow chart of FIG. 11 as follows.

At a step #201, the lid closing switch 53 is turned on. The flow of operation comes to a step #202. At the step #202, the motor driver 56 is caused to energize the motor A 15 in the reverse direction for closing the sliding lid 10. At a step #203, a check is made for the state of a bridging timer, which is arranged to begin to count time at the start of the energization. If the count value of the timer is less than the predetermined period of time, the flow comes to a step #204. At the step #204, a check is made to find if the lid opening detecting switch 55 have turned on within a predetermined period of time. If so, the flow comes to a step #205. At the step #205, the motor driver 56 is caused to stop energizing the motor A 15 to bring the lid closing action to an end. If a predetermined period of time set for the timer is found to have been exceeded at the step #203, the MPU 51 judges that the sliding lid 10 cannot be closed as the lid closing switch 53 is operated by the operator while the film cartridge is in a state of being inserted as shown in FIG. 6. The flow then comes to a step #206 to cause the motor driver 56 to stop energizing the motor A 15. At a step #207, the motor driver 56 is caused to begin to energize the motor A 15 in the reverse direction for opening the sliding lid 10 once again. At a step #208, a check is made to find if the lid opening detecting switch 54 has turned on. If so, the flow comes to a step #209. At the step #209, the motor driver 56 is caused to stop energizing the motor A 15. At a step #210, a warning circuit 60 is caused to give a warning against the erroneous operation.

FIGS. 12 to 15 show a second embodiment of this invention. While the first embodiment described above is arranged to electrically drive the sliding lid 10 by means of the motor A 15, the second embodiment has a hinged type lid arranged to be manually operated. In FIGS. 12 to 15, all parts arranged in the same manner as those of the first embodiment are shown by the same reference numerals.

Figure 12:
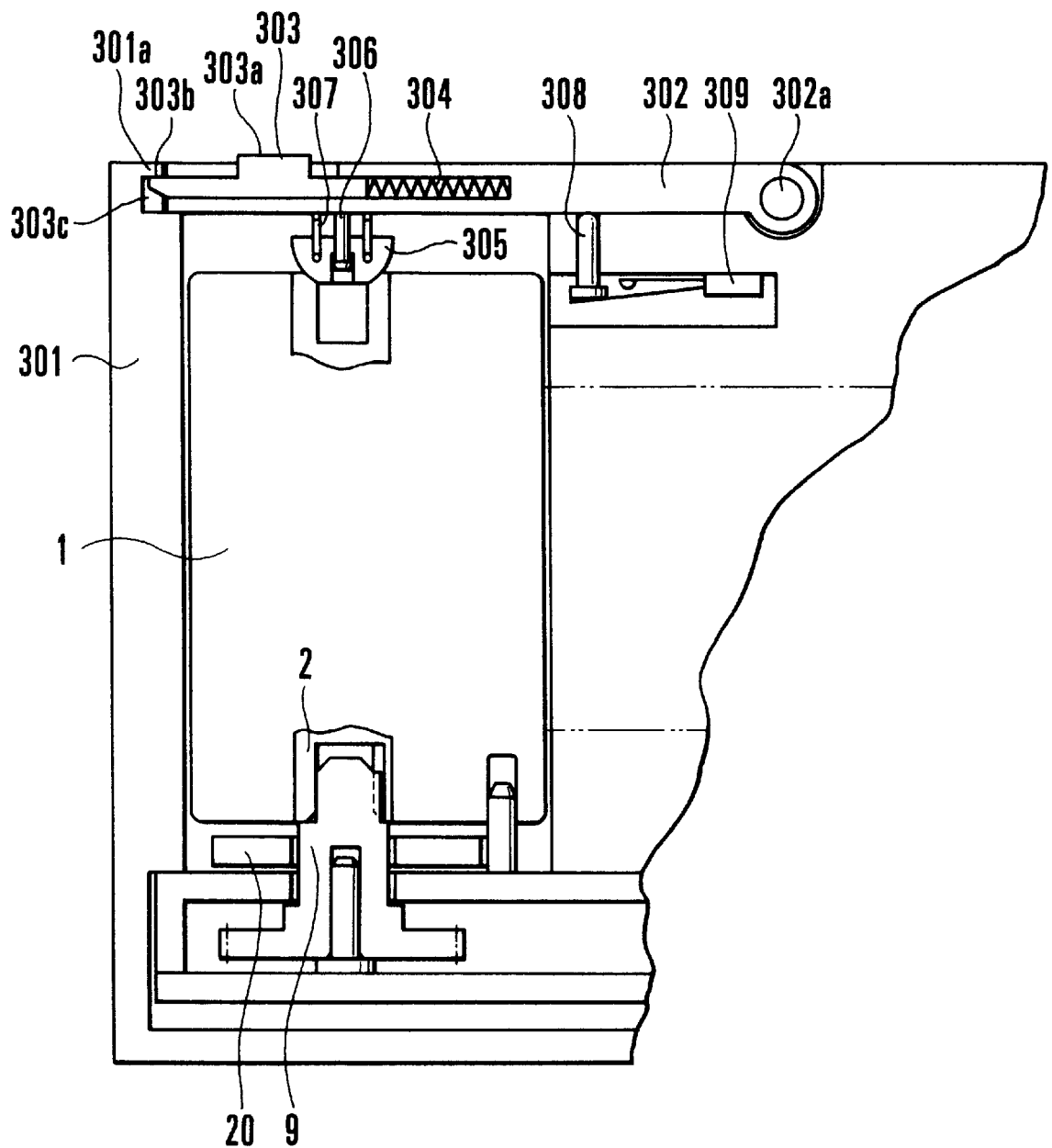
FIG. 12 shows a second embodiment of this invention as in a state of having the lid of its cartridge chamber closed.

FIG. 12 shows the relation of the film cartridge 1 to the lid after the camera is loaded with the film cartridge 1. The mechanism of the second embodiment is first described with reference to FIG. 12. The driving member 9 which drives the film cartridge 1 and the spool shaft 2 and the parts related to the lift member 20 which functions to pull in and push out the film cartridge 1 are arranged in the same manner as in the case of the first embodiment and therefore the details of them will be omitted from the following description.

Figure 13:
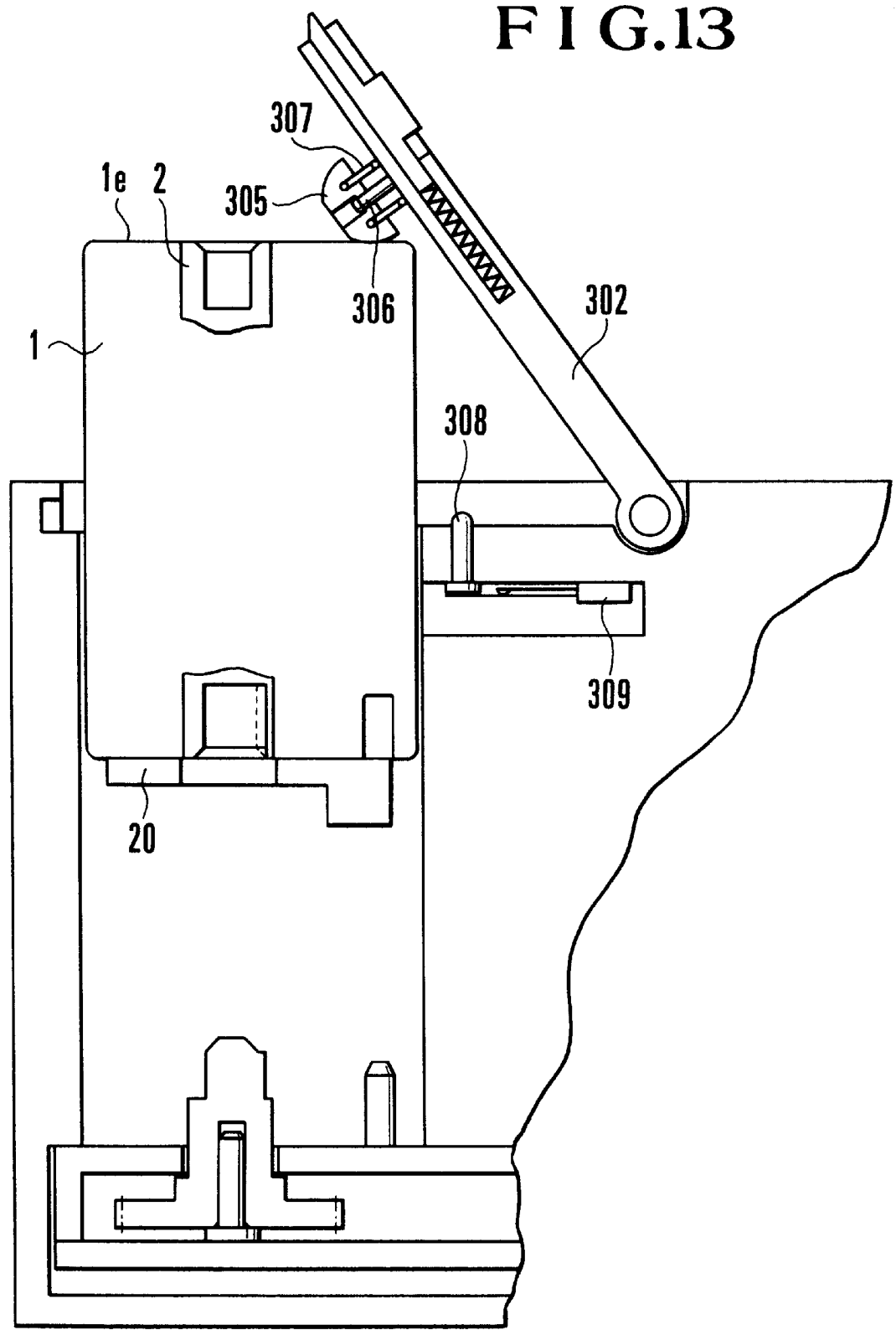
FIG. 13 shows the cartridge chamber of FIG. 12 as in a state of having its lid opened.

A hinged type lid 302 has a shaft 302a rotatably carried by a camera body 301. A lock member 303 consists of a sliding operation part 303a, a locking part 303b and a tapered part 303c which is provided for one-touch locking in closing the lid 302. A spring 304 is arranged to urge the lock member 303 toward a part where the locking part 303b engages a protruding part of the camera body 301. The camera includes a lid detecting pin 308 and a lid detecting switch 309 which turns off when the lid is closed as shown in FIG. 12 and turns on when the lid is is opened as shown in FIG. 13. A retaining member 305, a shaft 306 and a spring 307 are arranged and function in the same manner as the corresponding parts of the first embodiment. Therefore the details of them are omitted from the following description.

FIG. 13 corresponds to FIG. 6 which shows the first embodiment. In FIG. 13, the film cartridge 1 is shown as at the end of its ascent. The retaining member 305 is abutting on the opposed side 1e of the film cartridge 1. When the hinged type lid 102 is closed, the film cartridge comes down to come to a state corresponding to the state of FIG. 7 of the first embodiment. Then an automatic film cartridge pull-in action begins. Although it is not shown, a spring may be arranged to urge the hinged type lid 302 in the direction of opening the lid for improvement in operability.

The second embodiment is arranged to permit pushing the film cartridge 1 into the cartridge chamber with the hinged type lid for the purpose of reducing the number of steps of manual operation. However, it goes without saying that the automatic pull-in action can be caused to begin also by pushing the film cartridge into the cartridge chamber with a finger.

Figure 14:
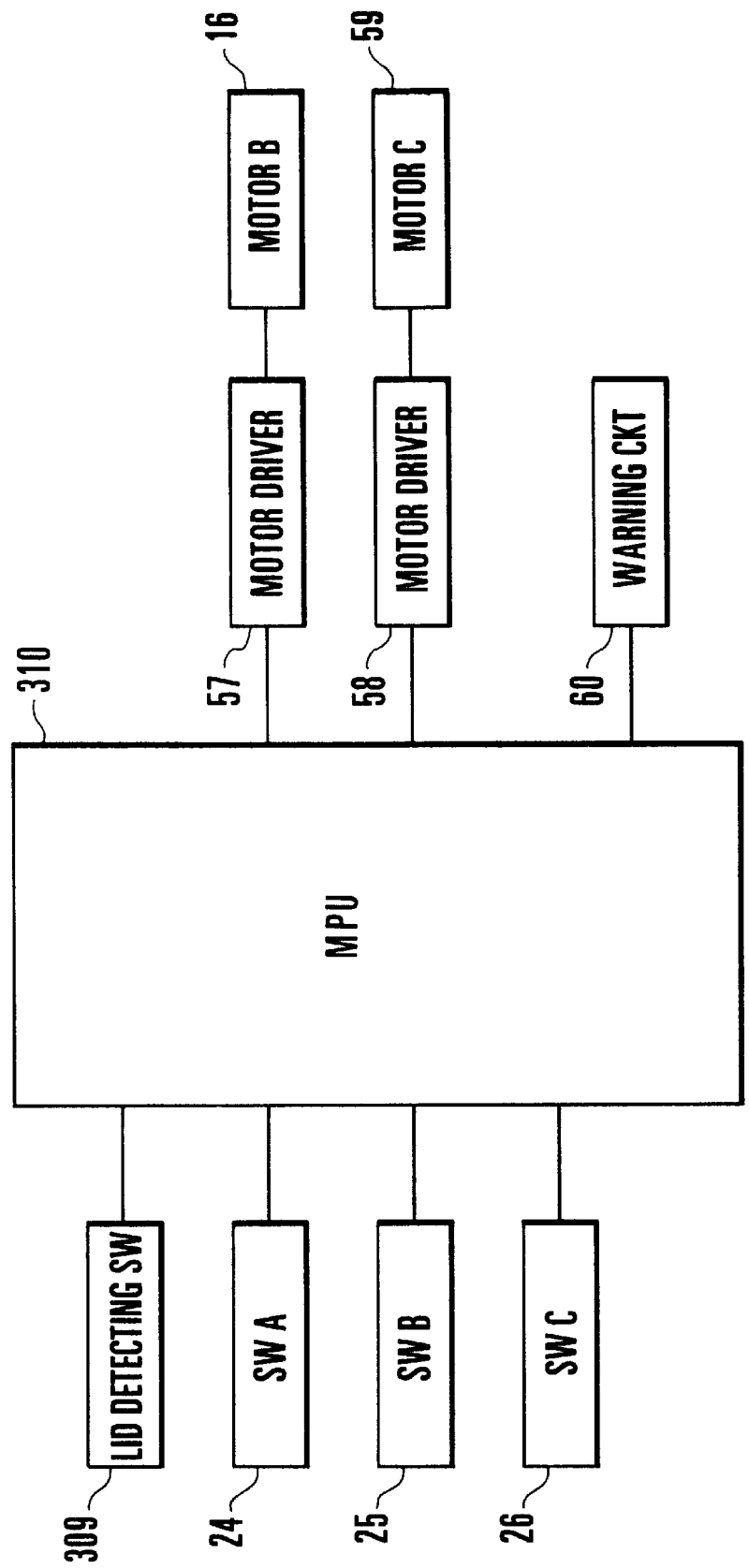
FIG. 14 is a block diagram showing a circuit arrangement of the second embodiment.

FIG. 14 is a block diagram showing a circuit arrangement of the second embodiment for carrying out its actions as mentioned above. The circuit arrangement includes an MPU 310. The input signals of the MPU 310 are shown on the left side and the output signals on the right side as viewed on the drawing. A lid detecting switch 309 is arranged to turn off when the hinged type lid 302 is closed and to turn on when the lid 302 is opened. The switch A 24, the switch B 25, the switch C 26, the motor driver 57, the motor B 16, the motor driver 58 and the motor C 59 are identical with those of the first embodiment and the details of them are, therefore, omitted from the following description.

Figure 15:
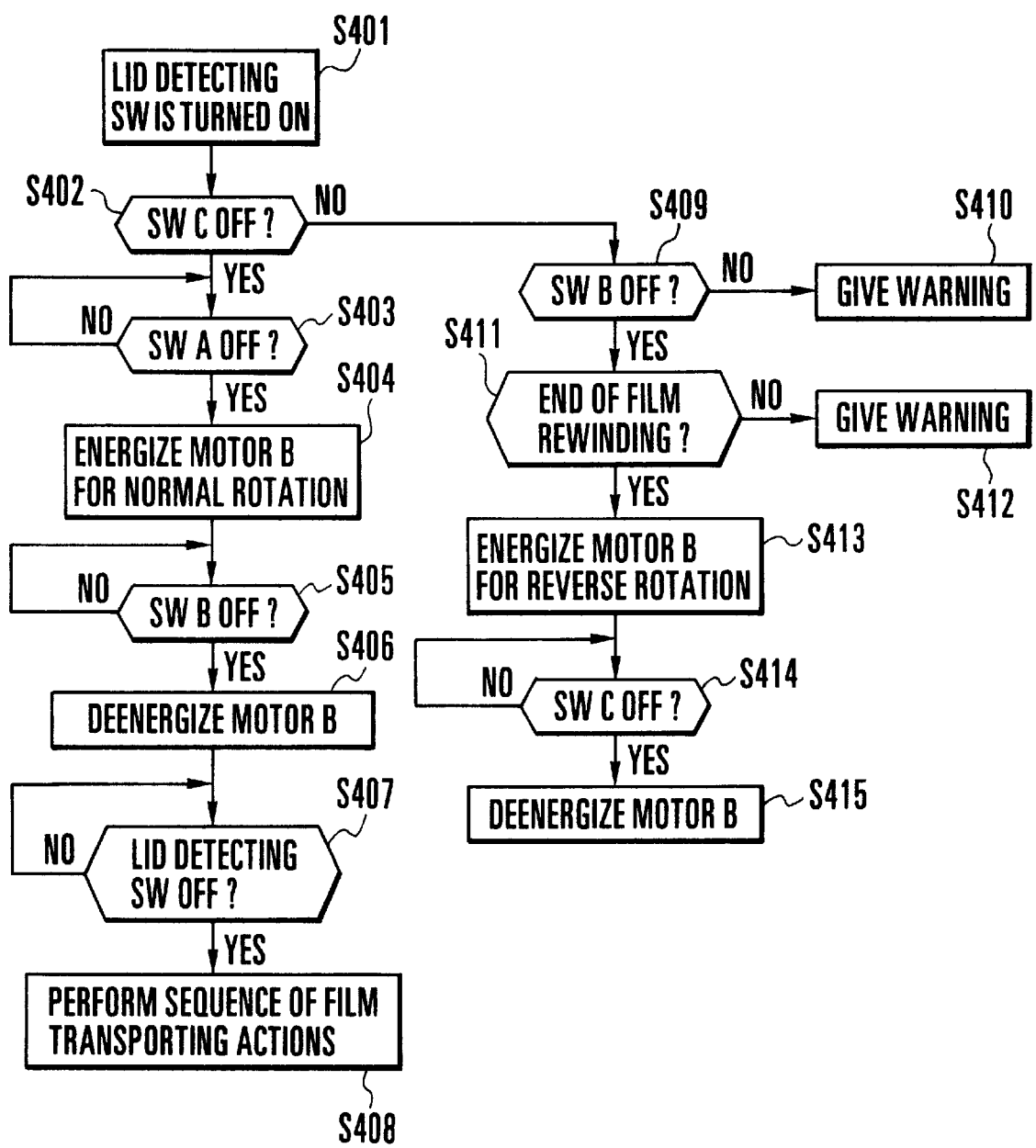
FIG. 15 is a flow chart showing the operation of the circuit arrangement shown in FIG. 14.

The operation of the MPU 301 of the circuit arrangement of FIG. 14 to be performed when the lid detecting switch 309 turns on is described with reference to FIG. 15 as follows. At a step #401, when the hinged type lid 302 is opened by operating the lock member 303, the lid detecting switch 309 turns on. At a step #402, a check is made to find if the switch C 26 is in an off-state. If so, the flow of operation comes to a step #403 to waits for turning off of the switch A 24. In other words, the flow waits until the film cartridge 1 which is dropped into the cartridge chamber is further pushed into the chamber from the state shown in FIG. 13. When the switch A 24 is found to have turned off, the flow comes to a step #404. At the step #404, the motor driver 57 is caused to energize the motor B 16 in the normal direction (for normal rotation). A film cartridge pulling-in action is thus performed. At a step #405, a check is made to find if the switch B 25 has turned off. If so, the flow comes to a step #406. At the step #406, the motor driver 57 is caused to stop energizing the motor B 16 and a sequence of processes for the film cartridge pulling-in action comes to an end. The flow then comes to a step #407 to find if the lid detecting switch 309 has turned off. If so, the flow comes to a step #408 to enter a sequence of processes for film transportation. At the step #408, the motor driver 58 is caused to drive the motor C 59 and the film begins to be sent out (payed out) from the cartridge.

If the switch C 26 is found to be not in an off-state at the step #402, the flow comes to a step #409. At the step #409, a check is made to find if the switch B 25 is in its off-state. If not, it indicates an abnormal state and, therefore, the flow comes to a step #410 to cause the warning circuit 60 to give a warning. If so, the flow comes to a step #411. At the step #411, a check is made to find if a film rewinding action has finished. If not, the camera is judged to be in process of photographing and the flow comes to a step #412 to cause the warning circuit 60 to give a warning. If so, the flow comes to a step #413. At the step #413, the motor driver 57 is caused to energize the motor B 16 in the reverse direction (for reverse rotation) and a film cartridge pushing-up action is performed. At a step #414, a check is made to find if the switch C 26 has turned off. If so, the flow comes to a step #415 to cause the motor driver 57 to stop energizing the motor B 16. A sequence of processes for pushing the film cartridge 1 upward then comes to an end. A state thus obtained enables the operator to easily take out the film cartridge by hand. When the hinged type lid 302 is closed after the film cartridge 1 is taken out, the camera makes no particular reaction to the lid closing action. The flow of operation forcibly proceeds to the step #401 when the lid detecting switch 309 turns on with the hinged type lid 302 opened.

Each of the embodiments described is provided with an engaging member which is arranged to engage a recessed part formed in the film cartridge. The film cartridge is thus movable up and down by means of the engaging member. In pulling in and pushing out the film cartridge by using the electric motor, this arrangement not only greatly enhances the operability but also ensures a reliable interface between the camera and the film cartridge, so that the film cartridge loading and unloading actions can be reliably carried out.

In each of the embodiments, the engaging member 21 is arranged to be caused to act by the action of loading the film cartridge 1. However, the engaging member may be arranged to be caused to act by the action of unloading the film cartridge or by both the film cartridge loading and unloading actions.

Further the engaging member 21 does not have to be arranged to move along with the film cartridge but may be arranged in a different manner so long as it is movable for loading or unloading the film cartridge.

The shape of the engaging member 21 is not limited to the shape employed for the embodiments described. In accordance with this invention, the engaging member 21 may be arranged in any other shape so long as the film cartridge can be loaded or unloaded (taken out) without causing any slippage between the engaging member 21 and the film cartridge.

The drive source for loading and unloading the film cartridge is of course not limited to the driving force of the motor. A driving force of some other drive source such as some other electric driving means, a spring or a manual operation may be employed in place of the motor in carrying out this invention.

The film cartridge loading direction is not limited to loading it from above, as in the cases of the embodiments described. The camera may be arranged to be loaded with the film cartridge, for example, from below or from one side of the camera.

Further, in accordance with this invention, the film cartridge is not limited to the axially loading type as in the cases of the embodiments described.

This invention is applicable not only to a film but also to an image recording medium other than a film.

This invention is applicable also to a cartridge of a type which differs from the type of the cartridge to be used by the embodiments described, or to a cartridge containing an image recording medium other than a film, to a different kind of a cartridge, or even to some other loading matter other than a cartridge such as a battery.

Further, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further the individual components shown in schematic or block form in the drawings are all well-known in the camera arts and their specific construction and operation are not critical to the operation or best mode for carrying out the invention.

The invention can be practiced by arranging the embodiments or their technological elements in combination as desired. The invention applies also to an apparatus which consists of the components of the embodiments described either in their entirety or in part. The embodiments may be combined with some other apparatus or may be employed as a component of the apparatus.

The invention is applicable to cameras of varied kinds such as a single-lens reflex camera, a lens-shutter type camera, and a video camera, to an optical apparatus or some other apparatus other than a camera and to a device or an element that is employed as a component of a camera, an optical apparatus or some other apparatus.

What is claimed is:

1. An apparatus adapted to a film cartridge, comprising:
   a) a first device which engages a recessed part of the film cartridge;
   b) a second device which performs at least one of loading and unloading the film cartridge with respect to the apparatus by moving said first device engaging the recessed part of the film cartridge; and
   c) a third device for preventing said first device from engaging the film cartridge when the film cartridge is in a completely loaded state.

2. An apparatus according to claim 1, wherein:
   the one of loading and unloading of the film cartridge is with respect to a cartridge loading chamber of the apparatus; and said third device prevents said first device from engaging the film cartridge by a closing action of a cover of the cartridge loading chamber of the apparatus.

3. An apparatus according to claim 1, wherein said second device comprises a motor.

4. An apparatus according to claim 1, wherein:

the one of loading and unloading of the film cartridge is with respect to a cartridge loading chamber of the apparatus; and further comprising a control device which causes said second device and a cover of the cartridge loading chamber of the apparatus to operate in sequence.

5. An apparatus according to claim 1, wherein said second device comprises an electric driving device.

6. An apparatus according to claim 1, wherein:

the one of loading and unloading of the film cartridge is with respect to a cartridge loading chamber of the apparatus; and further comprising an ejecting device which ejects the film cartridge from the cartridge loading chamber of the apparatus by pushing the film cartridge in a direction of ejecting the film cartridge from the cartridge loading chamber.

7. An apparatus according to claim 1, wherein said apparatus comprises a camera.

8. An apparatus according to claim 1, further comprising:

a elastic member for biasing said first device to engage the recessed part of the film cartridge.

9. An apparatus according to claim 1, wherein:

the one of loading and unloading of the film cartridge is with respect to a cartridge loading chamber of the apparatus; and further comprising a control device which causes said second device and a cover of the cartridge loading chamber of the apparatus to automatically operate in sequence.

10. An apparatus according to claim 9, further comprising:

an electric driving device for driving the cover of the cartridge loading chamber.

11. An apparatus according to claim 1, wherein:

the one of loading and unloading of the film cartridge is with respect to a cartridge loading chamber of the apparatus; and further comprising an electric driving device for driving a cover of the cartridge loading chamber.

12. An apparatus according to claim 1, wherein:

the one of loading and unloading of the film cartridge is with respect to a cartridge loading chamber of the apparatus; and further comprising a motor for driving a cover of the cartridge loading chamber.

13. An apparatus according to claim 1, further comprising:

a moving device which moves said first device to a position where said first device permits the film cartridge to be fully unloaded from said apparatus.

14. An apparatus adapted to a cartridge, comprising:

a) a first device which engages a recessed part of the cartridge;

b) a second device which loads the cartridge with respect to said apparatus by moving said first device engaging the recessed part of the cartridge; and c) a third device for preventing said first device from engaging the film cartridge when the film cartridge is in a completely loaded state.

15. An apparatus according to claim 14, wherein said apparatus comprises a camera.

16. An apparatus according to claim 14, wherein the cartridge comprises a film cartridge.

* * * * *

UNITED STATES PATENT AND TRADEMARK OFFICE
CERTIFICATE OF CORRECTION

PATENT NO. : 6,152,615  
DATED : November 28, 2000  
INVENTOR(S) : Shosuke Haraguchi Page 1 of 1

It is certified that error appears in the above-identified patent and that said Letters Patent is hereby corrected as shown below:

Column 1,
Line 42, delete "unloaded." and insert -- unloaded --.

Column 7,
Line 5, delete "c on trolled" and insert -- controlled --.

Signed and Sealed this

First Day of January, 2002

Attest:

Attesting Officer

JAMES E. ROGAN
Director of the United States Patent and Trademark Office